July 23, 1940.　　　M. J. GAMBOA　　　2,208,670
VEHICLE TIRE
Filed March 2, 1939
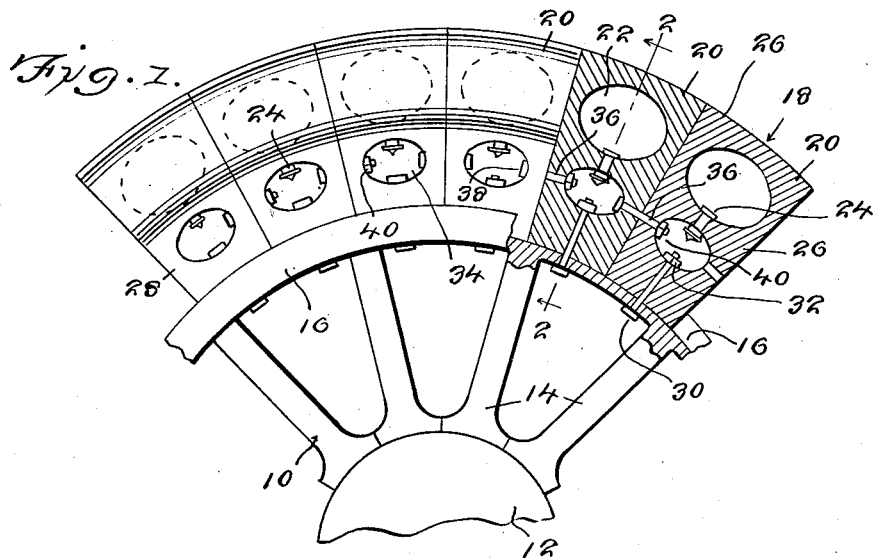
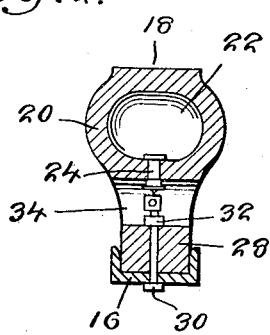
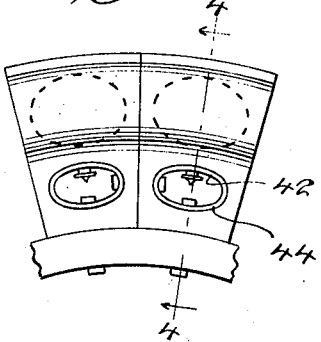
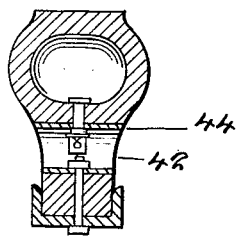
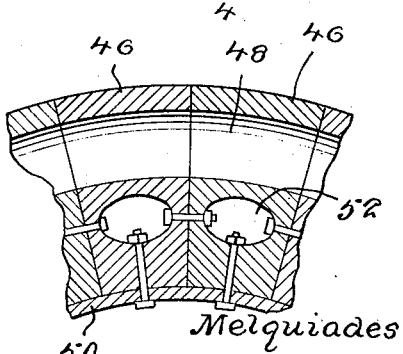
Melquiades J. Gamboa, INVENTOR
BY Victor J. Evans & Co.
ATTORNEYS Patented July 23, 1940

2,208,670

UNITED STATES PATENT OFFICE 2,208,670

VEHICLE TIRE

Melquiades J. Gamboa, Manila, P. I.

Application March 2, 1939, Serial No. 259,472

3 Claims. (Cl. 152—159)

My invention relates to automotive vehicles, and has among its objects and advantages the provision of an improved pneumatic tire.

An object of my invention is to provide a pneumatic tire made up of a plurality of individual units which may be assembled upon the rim of the wheel and effectively connected therewith. The sections are so related as to provide a pneumatic wheel embodying a large degree of resilient continuity circumferentially of the wheel. In addition, each section is readily disconnected from the adjoining section so as to facilitate replacement of damaged and worn sections. Puncture or destruction of one section does not impair the efficiency of the remaining sections, so that an impaired section does not totally incapacitate the vehicle. Sections may be removed from the wheel assembly without necessitating raising of the wheel from the road bed. The sectional construction provides a highly efficient anti-skidding wheel, in that the edges of the sections will give the tire an effective grip on the road bed.

In the accompanying drawing:

Figure 1 is a fragmentary elevational view of a tire in accordance with my invention with certain of the tire sections illustrated in section for the sake of clearness;

Figure 2 is a sectional view along the line 2—2 of Figure 1;

Figure 3 is a side elevational view of a plurality of tire sections of a slightly different form of construction;

Figure 4 is a sectional view along the line 4—4 of Figure 3; and

Figure 5 is a sectional view of a different form of a sectional tire.

In the embodiment selected to illustrate my invention, I make use of a wheel unit 10 which includes a hub structure 12, spokes 14 and a rim 16 which supports the resilient tire 18. Rim 16 is preferably U-shaped in cross section, as illustrated in Figure 2.

Tire 18 comprises a plurality of sections 20 of resilient material such as rubber. Each section includes a relatively large cavity 22 which may be supplied with air under pressure through the medium of an inflating valve 24 adapted for connection with a conventional air hose. All the sections are identical in construction and have their ends 26 arranged in face-to-face relation to provide a tire 18 of continuous body.

According to Figure 2, the section 20 illustrated therein includes a narrowed body 28 arranged to fit inside the channel-shaped rim 16. The section 20 is fixedly related to the rim 16 through the medium of a bolt 30 which passes through an opening in the rim 16 and is provided with a nut 32 inside the transverse opening 34 in the section. It will also be noted that the inflating valve 24 is accessible by reason of the opening 34. The opening lends easy access to the nut 32 as well as the inflating valve 24, and permits the two parts to be housed within the cross sectional contour of the section for the sake of compactness, appearance and protection for the parts.

In addition to bolts 30 as an anchor means for the sections 20, the sections are interconnected through the medium of tie-bolts 36. The head 38 of one bolt 36 is accessible inside the opening 34 in one section 20, while the nut 40 of that bolt is accessible inside the opening 34 in the adjacent section 20. It will thus be seen that the sections 20 are connected into a unitary structure through the medium of the bolts 36, in addition to being effectively anchored to the rim 16 through the medium of the bolts 30.

Figures 3 and 4 illustrate a slightly different form of construction, in that the transverse opening 42 corresponding to the openings 34 is lined with a metallic sleeve 44. The sleeves 44 reinforce the sections in and about the openings 42. In other respects, the sections are identical with the sections 20 of Figures 1 and 2.

Figure 5 illustrates a further modification in that each section 46 which corresponds to the sections 20 is provided with a longitudinal opening 48 coextensive in length with the section, so that when all the sections are assembled about the rim 50 the openings 48 will define a continuous opening as illustrated in Figure 5. In other respects, the sections 46 are identical with those disclosed in Figures 1 to 4, with the exception that the sections are devoid of inflating valves. Openings 48 render the sections 46 highly resilient so as to greatly enhance the cushioning characteristics of the tire in the absence of air. Obviously, the transverse openings 52 may be provided with metallic liners such as those illustrated at 44.

Without further elaboration, the foregoing will so fully illustrate my invention that others may, by applying current knowledge, readily adapt the same for use under various conditions of service.

I claim:

1. A pneumatic wheel of the type described comprising a wheel rim, a plurality of tire sections grouped about the wheel rim, each of said tire sections being provided with a transverse opening and an individual air cell, an inflating valve communicating with each air cell and accessible inside the transverse opening in its respective section, and a bolt connection between each section and the wheel rim, said bolt having one end accessible from a position inside the transverse opening in its respective section.

2. A pneumatic wheel of the type described comprising a wheel rim, a plurality of tire sections grouped about the wheel rim, each of said tire sections being provided with a transverse opening and an individual air cell, an inflating valve communicating with each air cell and accessible inside the transverse opening in its respective section, a bolt connection between each section and the wheel rim, said bolt having one end accessible from a position inside the transverse opening in its respective section, and tie-bolts interconnecting the sections, each tie-bolt having one end accessible from a position inside the transverse opening in one section and its opposite end accessible from the position inside the transverse opening in an adjacent section.

3. A pneumatic wheel of the type described comprising a wheel rim, a plurality of tire sections grouped about the wheel rim, each of said tire sections being provided with a transverse opening and an individual air cell, an inflating valve communicating with each air cell and accessible inside the transverse opening in its respective section, a bolt connection between each section and the wheel rim, said bolt having one end accessible from a position inside the transverse opening in its respective section, tie-bolts interconnecting the sections, each tie-bolt having one end accessible from a position inside the transverse opening in one section and its opposite end accessible from the position inside the transverse opening in an adjacent section, and a metallic liner for each of said transverse openings.

MELQUIADES J. GAMBOA.